United States Patent
Tochigi et al.

[11] Patent Number: 5,917,661
[45] Date of Patent: Jun. 29, 1999

[54] READING LENS SYSTEM

[75] Inventors: Akiyoshi Tochigi, Kokubunji; Tetsuo Nagata, Hachioji, both of Japan

[73] Assignee: Olympus Optical Co., Ltd., Tokyo, Japan

[21] Appl. No.: 08/789,182

[22] Filed: Jan. 24, 1997

[30] Foreign Application Priority Data

Jan. 25, 1996 [JP] Japan .................................. 8-030100

[51] Int. Cl.⁶ .............................. G02B 3/02; G02B 9/06; G06K 7/10
[52] U.S. Cl. .......................... 359/717; 359/739; 359/794; 235/454
[58] Field of Search .................... 359/717, 739, 359/794; 235/454

[56] References Cited

U.S. PATENT DOCUMENTS 5,666,234  9/1997  Ohno ........................................ 359/794

FOREIGN PATENT DOCUMENTS

| 1-274109 | 11/1989 | Japan . |
| 2-48886 | 10/1990 | Japan . |
| 3-242608 | 10/1991 | Japan . |
| 6-222264 | 8/1994 | Japan . |
| 6-258574 | 9/1994 | Japan . |

Primary Examiner—Georgia Epps
Assistant Examiner—Evelyn A. Lester
Attorney, Agent, or Firm—Pillsbury Madison & Sutro LLP

[57] ABSTRACT

A reading lens system composed, in order from the object side, of a first positive biconvex lens component, a second positive meniscus lens component convex toward the image side and an aperture stop disposed on the image side of the second lens component. By setting a distance as measured from a first surface to an aperture stop of the reading lens system adequately, it is configured so as to have a short total length and allow little variation of a size of an image even when the image is defocused due to a variation of an object location.

16 Claims, 8 Drawing Sheets

READING LENS SYSTEM

BACKGROUND OF THE INVENTION a) Field of the Invention

The present invention relates to a reading lens system which is used for forming images of bar codes and other coded information on light receiving devices such as CCD's.

b) Description of the Prior Art

Optical instruments which are used for reading coded information such as bar codes have been developed in various types such as stationary type and handy type, and diversified specifications are desired for a reading lens system. In recent days in particular, compactness, light weight, low manufacturing cost and easy handling are desired for a reading lens system, and importance is laid on its characteristics such as the lens system having a short total length (a distance as measured from an object surface to an image surface), the lens system being composed of a small number of lens elements, the lens system allowing little variation of the size of an image which caused by defocusing due to a variation of an object location and that the lens system produces aberrations such as astigmatism and distortion in small amounts for reserving a certain required field angle. Since reading errors are fatal for optical instruments of this kind, it is important to reduce variations of the size of an image caused when the image is defocused due to a variations of the object location.

SUMMARY OF THE INVENTION

A primary object of the present invention is to provide a reading lens system which has a short total length (a distance as measured from an object surface thereof to an image surface thereof), is composed of a small number of lens elements, allows little variation of size image size when it is defocused due to variation of an object location, and produces astigmatism and distortion in small amounts.

The reading lens system according to the present invention is composed of two lens components of two lens elements, or in order from the object side, a first positive biconvex lens component, a second positive meniscus lens component that is convex toward the image side and an aperture stop disposed on the image side of the second lens component.

The reading lens system according to the present invention is composed of the two positive lens components so that the lens system as a whole can have a short focal length f and a total length which can be shortened at an optional magnification. Further, the reading lens system according to the present invention comprises an aperture stop which is disposed on the image side of the second lens component so that it can have an entrance pupil located sufficiently far toward the image side while suppressing astigmatism, distortion, etc. to small amounts, whereby the lens system is capable of suppressing a variation of the image size to a low level even when it is defocused due to a variation of an object location.

Further, the reading lens system according to the present invention satisfies the following condition (1):

$$0.24 \leq (d_1+d_2+d_3+d_4)/f \leq 7.20 \tag{1}$$

DETAILED DESCRIPTION OF THE PREFERRED EMBODIMENTS

Figure 1:
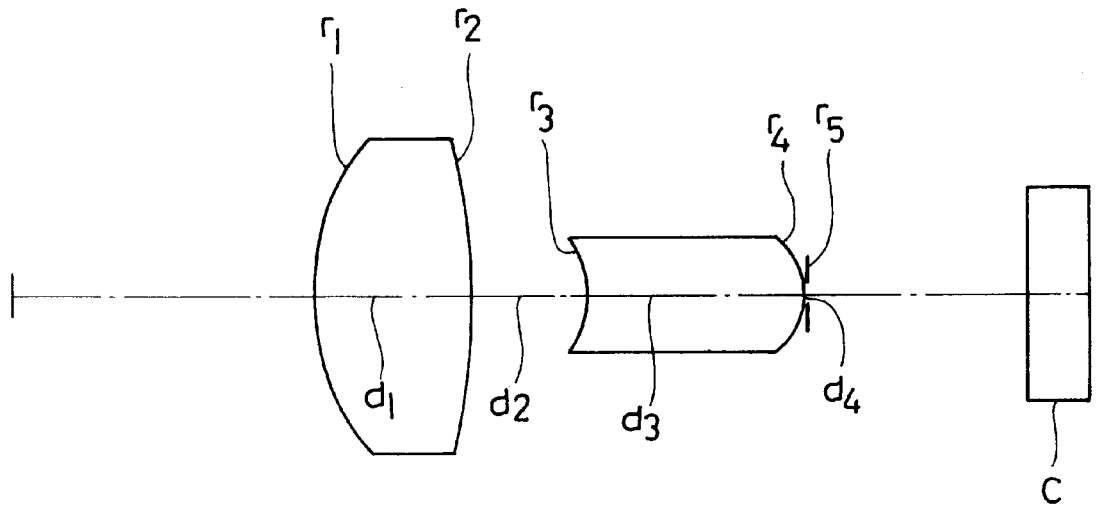
FIGS. 1 through 9 show sectional views illustrating compositions of first through ninth embodiments of the reading lens system according to the present invention.
Figure 2:
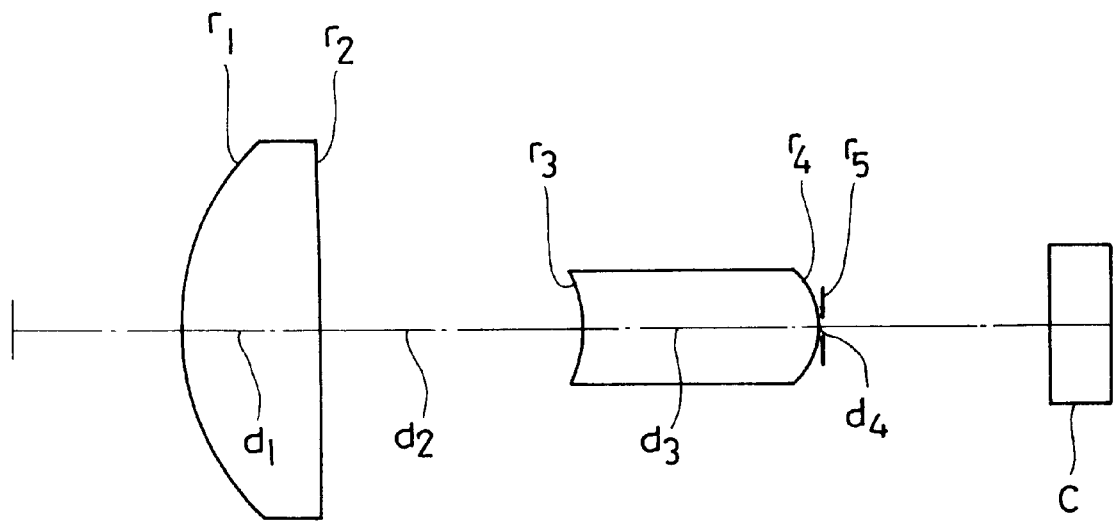
Figure 3:
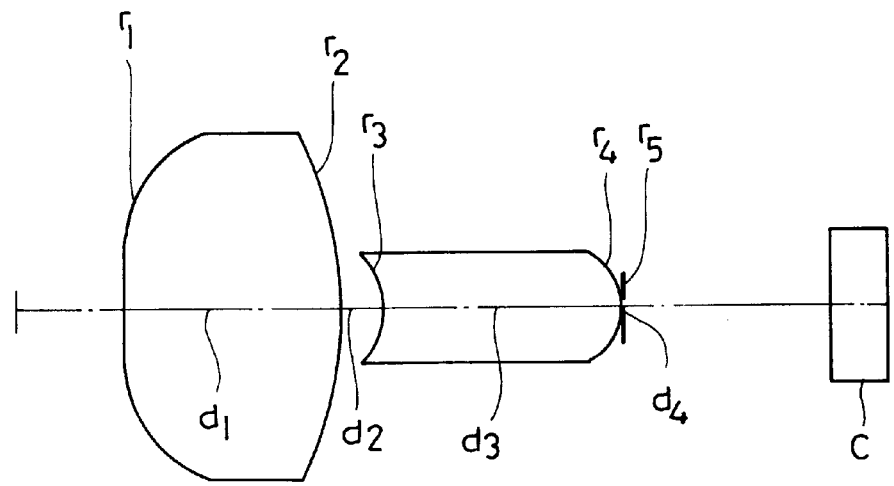
Figure 4:
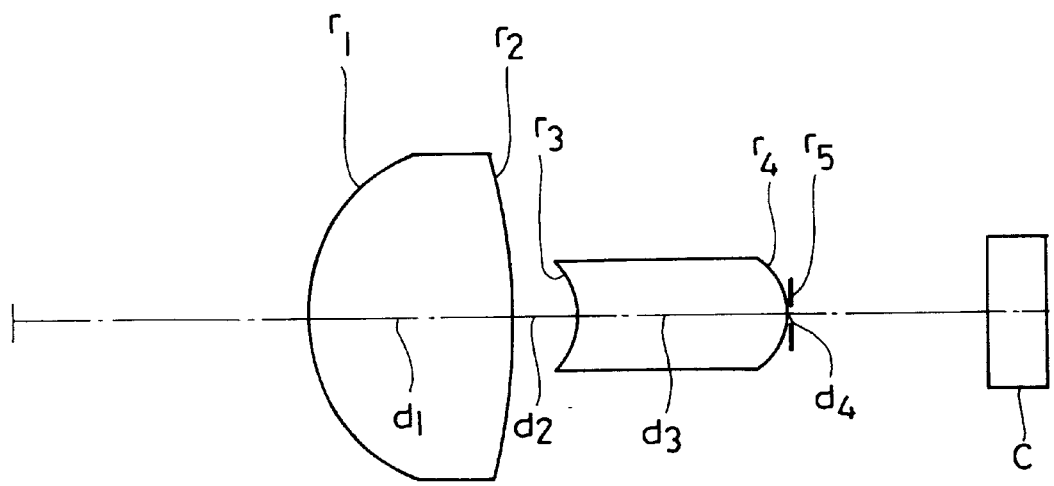
Figure 5:
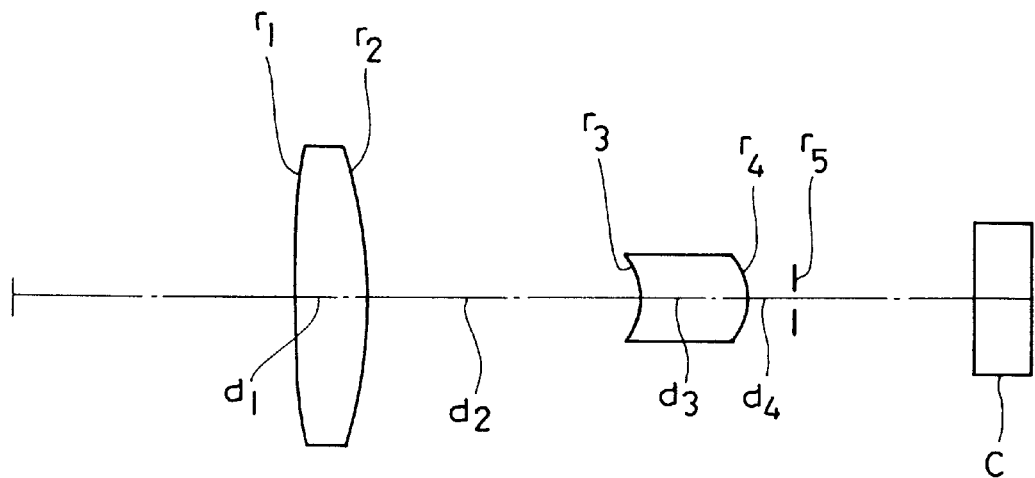
Figure 6:
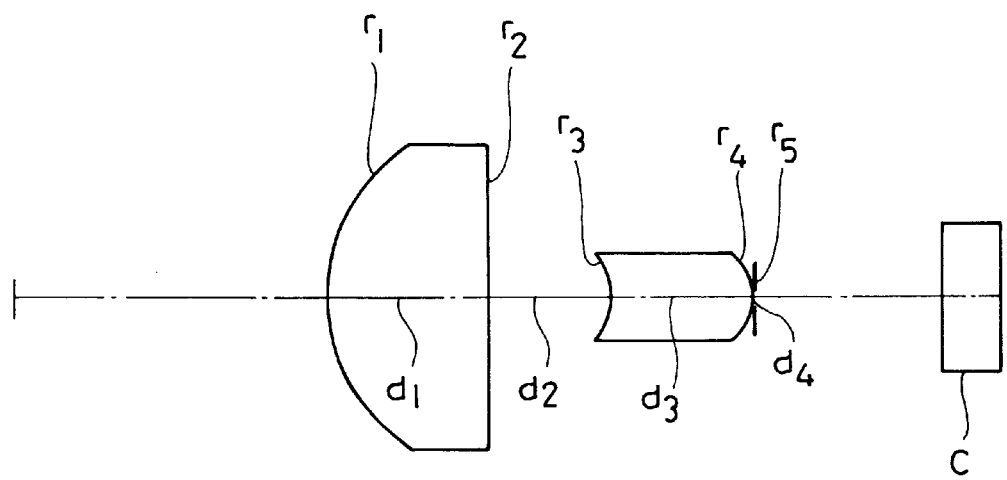
Figure 7:
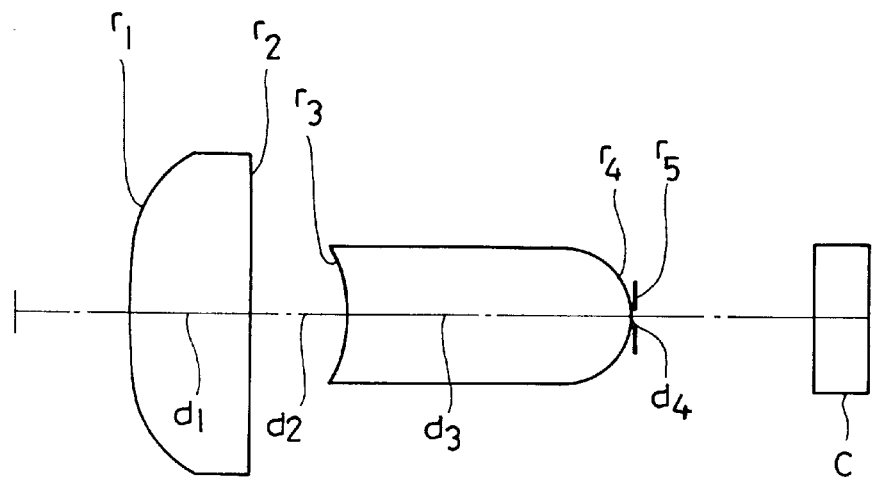
Figure 8:
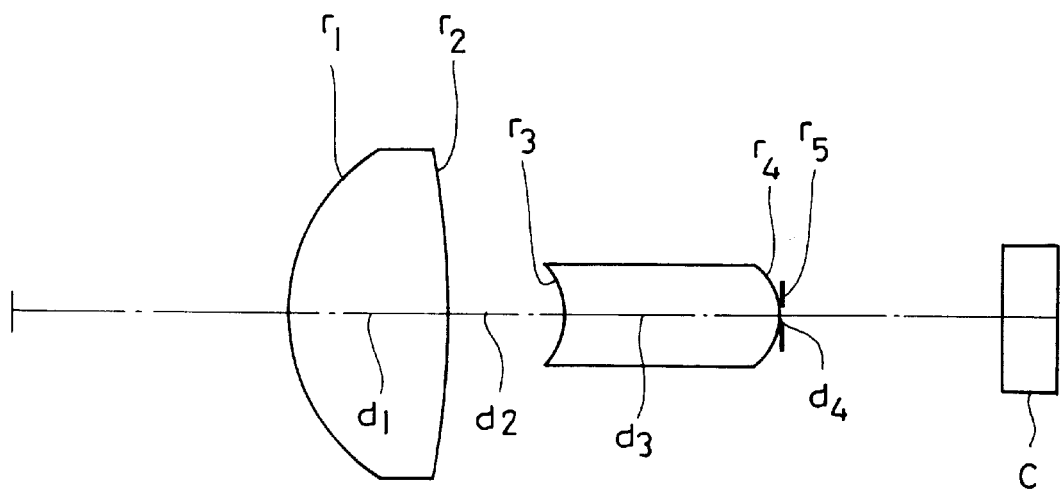
Figure 9:
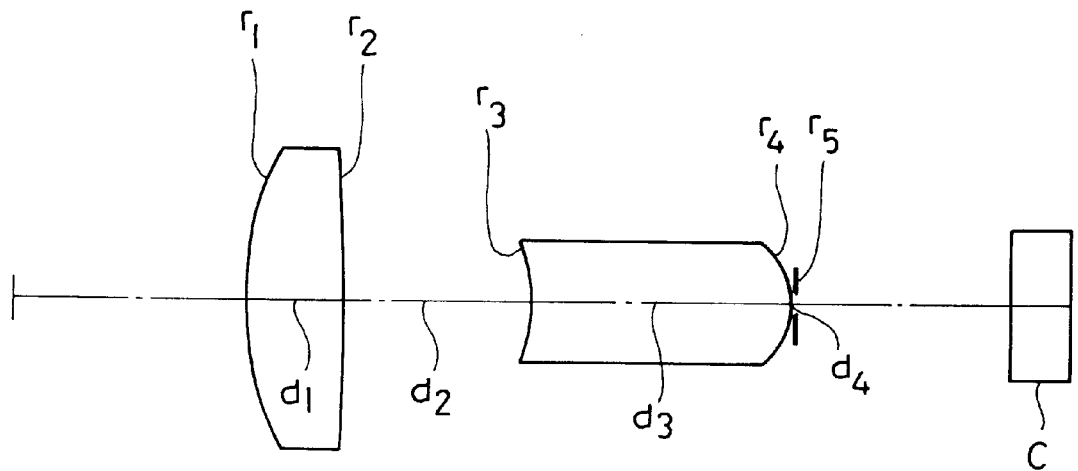

The reading lens system according to the present invention is composed of two lens components of two lens elements as shown, for example, in FIG. 1, or in order from the object side, of a first positive biconvex lens component, a second positive meniscus lens component convex toward the image side and an aperture stop disposed on the image side of the second lens component. The reading lens system according to the present invention is composed of the two positive lens components, whereby the lens system as a whole can have a short focal length f and a short total length at an optional magnification. Further, the aperture stop is disposed on the image side of the second lens component, whereby an entrance pupil can be located sufficiently far toward the image side while suppressing astigmatism, distortion, etc. at low levels and a variation of a size of an image can be suppressed at a low level even when it is defocused due to variation of an object location.

Furthermore, the reading lens system according to the first preferred embodiment of the present invention satisfies the following condition (1):

$$0.24 \leq (d_1+d_2+d_3+d_4)/f \leq 7.20 \tag{1}$$

wherein the reference symbol f represents a focal length of the reading lens system as a whole, the reference symbol $d_1$ designates a thickness of the first lens component, the reference symbol $d_2$ denotes an airspace reserved between the first lens component and the second lens component, the reference symbol $d_3$ represents a thickness of the second lens component and the reference symbol $d_4$ designates an airspace reserved between the second lens component and the aperture stop.

When the condition (1) is satisfied, an entrance pupil can be located sufficiently far toward the image side, whereby a variation of an image size, caused when the image is defocused due to a variation of an object location, can be reduced.

For correcting astigmatism and distortion with good balance, it is desirable to satisfy, in addition to the condition (1), at least one of the following conditions (4) through (7):

$$0.07 \leq d_1/f \leq =2.80 \tag{4}$$

$$0.12 \leq d_2/f \leq 2.30 \tag{5}$$

$$0.055 \leq d_3/f \leq 7.00 \tag{6}$$

$$0.03 \leq S_2 \leq 0.92 \tag{7}$$

wherein the reference symbol $S_2$ represents a value which is given by the following equation:

$$S_2=(r_3-r_4)/(r_3+r_4)$$

wherein the reference symbol $r_3$ represents a radius of curvature on an object side surface of the second lens component and the reference symbol $r_4$ designates a radius of curvature on an image side surface of the second lens component.

More favorable results can be obtained by defining the above-mentioned condition (1) as follows. In other words, it is preferable that the reading lens system according to the present invention described above satisfies, in place of the condition (1), the following condition (2):

$$0.89 \leq (d_1+d_2+d_3+d_4)/f \leq 5.70 \qquad (2)$$

When the condition (2) is satisfied, the entrance pupil can be located sufficiently far toward the image side, thereby making it possible to reduce a variation of a size of an image caused by defocusing of the image due to a variation of an object location.

Amounts of astigmatism and distortion can be further reduced with good balance when the lens system satisfies, in addition to the condition (2), at least one of the following conditions (8) through (11):

$$0.20 \leq d_1/f \leq 2.32 \qquad (8)$$

$$0.17 \leq d_2/f \leq 1.78 \qquad (9)$$

$$0.27 \leq d_3/f \leq 4.63 \qquad (10)$$

$$0.03 \leq S_2 \leq 0.70 \qquad (11)$$

It is more desirable to confine the above-mentioned condition (2) as follows. In other words, it is desirable that the reading lens system according to the present invention satisfies, in place of the above-mentioned condition (1) or (2), the following condition (3):

$$1.52 \leq (d_1+d_2+d_3+d_4)/f \leq 4.22 \qquad (3)$$

When the condition (3) is satisfied, the entrance pupil can be located sufficiently far toward the image side, thereby making it possible to reduce a variation of a size of an image caused by defocusing of the image due to a variation of an object location.

Amounts of astigmatism and distortion can be further reduced with good balance when the lens system is configured to satisfy, in addition to the condition (3), at least one of the following conditions (12) through (15):

$$0.32 \leq d_1/f \leq 1.83 \qquad (12)$$

$$0.23 \leq d_2/f \leq 1.26 \qquad (13)$$

$$0.49 \leq d_3/f \leq 2.26 \qquad (14)$$

$$0.03 \leq S_2 \leq 0.50 \qquad (15)$$

A reading lens system according to a second preferred embodiment of the present invention is composed, in order from the object side, of a first positive biconvex lens component, a second meniscus lens component that is convex toward the image side and an aperture stop disposed on the image side of the second lens component, and satisfies at least one of the following conditions (16), (17), (18) and (19):

$$0.28 \leq d_1/f \leq 0.88 \qquad (16)$$

$$0.39 \leq d_2/f \leq 0.66 \qquad (17)$$

$$0.79 \leq d_3/f \qquad (18)$$

$$0.09 \leq S_2 \leq 0.15 \qquad (19)$$

When at least one of the conditions (16), (17), (18) and (19) is satisfied, an entrance pupil can be located sufficiently far toward the image side, thereby making it possible to reduce a variation of a size of an image which caused by defocus of the image due to the variation of the object location. This effect is enhanced by configuring the reading lens system so as to satisfy two, three or all of these conditions. Amounts of astigmatism and distortion can be further reduced by confining the range of the condition (18) with the following condition (20):

$$0.79 \leq d_3/f \leq 2.50 \qquad (20)$$

Amounts of astigmatism and distortion can be further reduced by configuring the reading lens system so as to satisfy at least one of the following conditions (21) through (24):

$$0.46 \leq d_1/f \leq 0.75 \qquad (21)$$

$$0.44 \leq d_2/f \leq 0.57 \qquad (22)$$

$$0.85 \leq d_3/f \leq 2.50 \qquad (23)$$

$$0.11 \leq S_2 \leq 0.14 \qquad (24)$$

A reading lens system according to a third preferred embodiment of the present invention is composed, in order from the object side, of a first positive biconvex lens component, a second meniscus lens component that is convex toward the image side and an aperture stop that is disposed on the image side of the second lens component, and is configured so as to satisfy all of the following conditions (25), (26), (27) and (28):

$$0.03 \leq d_1/f \leq 0.88 \qquad (25)$$

$$0.12 \leq d_2/f \leq 3.80 \qquad (26)$$

$$0.33 \leq d_3/f \qquad (27)$$

$$0.01 \leq S_2 \leq 3.00 \qquad (28)$$

When all of the conditions (25) through (28) are satisfied, an entrance pupil can be located sufficiently far toward the image side, thereby making it possible to reduce a variation of a size of an image caused by defocusing due to a variation of an object location.

Further, amounts of astigmatism and distortion can be reduced with good balance by configuring the reading lens system so as to satisfy all of the following conditions (29) through (32):

$$0.11 \leq d_1/f \leq 0.88 \qquad (29)$$

$$0.17 \leq d_2/f \leq 2.53 \qquad (30)$$

$$0.41 \leq d_3/f \qquad (31)$$

$$0.02 \leq S_2 \leq 1.75 \qquad (32)$$

Furthermore, amounts of astigmatism and distortion can be reduced with better balance by configuring the reading lens system so as to satisfy all of the conditions (33) through (36) mentioned below;

$$0.20 \leq d_1/f \leq 0.88 \qquad (33)$$

$$0.23 \leq d_2/f \leq 1.26 \qquad (34)$$

$$0.49 \leq d_3/f \qquad (34)$$

$$0.03 \leq S_2 \leq 0.50 \qquad (35)$$

If the upper limits or the lower limits of the conditions defined by the first through third inventions of the present invention are exceeded, astigmatism and distortion will be aggravated in the reading lens system according to the present invention.

Amounts of astigmatism and distortion can be further reduced in the reading lens system according to the first, second or third embodiment of the present invention by configuring at least one of the surfaces of the first and second lens components as an aspherical surface. This effect is enhanced by configuring first and third surfaces of the lens system as aspherical surfaces.

The reading lens system according to the first, second or third embodiment of the present invention can be configured so as to be light in weight and manufactured at a lower cost by using two plastic lens components which can be manufactured at low costs.

By disposing a reflecting surface which functions to bend an optical path between an object surface and an image surface of the reading lens system according to the first, second or third embodiment of the present invention, it is possible to freely select a location for a CCD in the optical system. By disposing a reflecting surface which functions to bend an optical path in the second lens component, in particular, it is possible to reduce the number of optical parts.

Now, description will be made of embodiments of the reading lens system according to the present invention. First through ninth embodiments of the reading lens system according to the present invention have compositions illustrated in FIGS. 1 through 9, in each of which the reading lens system is composed of two lens components of two lens elements, or in order from the object side, a first positive biconvex lens component $L_1$, a second positive meniscus lens component $L_2$ convex toward the image side and an aperture stop disposed on the image side of the second lens component. Aspherical surfaces are used as first and third surfaces. Further, a red light emitting diode is used as a light source (having a light emitting wavelength region of 610 to 700 nm and a centeral wavelength at 660 nm).

EMBODIMENT 1

| f = 8.081, $f_1$ = 15.183, $f_2$ = 4.606 | | | |
|---|---|---|---|
| $r_1$ = 10.076 (aspherical surface) | | | |
| | $d_1$ = 5.060 | $n_1$ = 1.48978 | $v_1$ = 57.66 |
| $r_2$ = −23.702 | | | |
| | $d_2$ = 3.880 | | |
| $r_3$ = −3.012 (aspherical surface) | | | |
| | $d_3$ = 7.240 | $n_2$ = 1.48978 | $v_2$ = 57.66 |
| $r_4$ = −2.309 | | | |
| | $d_4$ = 0.100 | | |
| $r_5$ = ∞ | | | | aspherical surface coefficients
(1st surface) $A_4$=5.1723×10$^{-4}$, $A_6$=8.5872×10$^{-7}$
(3rd surface) $A_4$=−4.6026×10$^{-3}$, $A_6$=1.2173×10$^{-3}$
$(d_1+d_2+d_3+d_4)/f$=2.015
$d_1/f$=0.626, $d_2/f$=0.48, $d_3/f$=0.896, $S_2$=0.133

EMBODIMENT 2

| f = 13.347, $f_1$ = 18.793, $f_2$ = 4.998 | | | |
|---|---|---|---|
| $r_1$ = 9.463 (aspherical surface) | | | |
| | $d_1$ = 4.500 | $n_1$ = 1.48978 | $v_1$ = 57.66 |
| $r_2$ = −284.302 | | | |
| | $d_2$ = 8.622 | | |

-continued

| f = 13.347, $f_1$ = 18.793, $f_2$ = 4.998 | | | |
|---|---|---|---|
| $r_3$ = −4.867 (aspherical surface) | | | |
| | $d_3$ = 7.893 | $n_2$ = 1.48978 | $v_2$ = 57.66 |
| $r_4$ = −2.497 | | | |
| | $d_4$ = 0.100 | | |
| $r_5$ = ∞ | | | | aspherical surface coefficients
(1st surface) $A_4$=1.8494×10$^{-4}$, $A_6$=−6.4503×10$^{-7}$
(3rd surface) $A_4$=−6.6281×10$^{-3}$, $A_6$=3.2056×10$^{-4}$
$(d_1+d_2+d_3+d_4)/f$=1.582
$d_1/f$=0.337, $d_2/f$=0.646, $d_3/f$=0.591, $S_2$=0.322

EMBODIMENT 3

| f = 4.066, $f_1$ = 27.967, $f_2$ = 3.711 | | | |
|---|---|---|---|
| $r_1$ = 1442.390 (aspherical surface) | | | |
| | $d_1$ = 7.400 | $n_1$ = 1.48978 | $v_1$ = 57.66 |
| $r_2$ = −13.806 | | | |
| | $d_2$ = 1.509 | | |
| $r_3$ = −2.644 (aspherical surface) | | | |
| | $d_3$ = 8.189 | $n_2$ = 1.48978 | $v_2$ = 57.66 |
| $r_4$ = −2.174 | | | |
| | $d_4$ = 0.047 | | |
| $r_5$ = ∞ | | | | aspherical surface coefficients
(1st surface) $A_4$=1.8442×10$^{-3}$, $A_6$=8.1027×10$^{-6}$
(3rd surface) $A_4$=−4.8917×10$^{-3}$, $A_6$=1.8965×10$^{-3}$
$(d_1+d_2+d_3+d_4)/f$=4.217
$d_1/f$=1.82, $d_2/f$=0.371, $d_3/f$=2.014, $S_2$=0.098

EMBODIMENT 4

| f = 9.302, $f_1$ = 11.773, $f_2$ = 4.166 | | | |
|---|---|---|---|
| $r_1$ = 6.943 (aspherical surface) | | | |
| | $d_1$ = 6.990 | $n_1$ = 1.48978 | $v_1$ = 57.66 |
| $r_2$ = −22.757 | | | |
| | $d_2$ = 2.233 | | |
| $r_3$ = −2.533 (aspherical surface) | | | |
| | $d_3$ = 7.282 | $n_2$ = 1.48978 | $v_2$ = 57.66 |
| $r_4$ = −2.198 | | | |
| | $d_4$ = 0.100 | | |
| $r_5$ = ∞ | | | | aspherical surface coefficients
(1st surface) $A_4$=4.0498×10$^{-4}$, $A_6$=7.0556×10$^{-6}$
(3rd surface) $A_4$=−3.1592×10$^{-3}$, $A_6$=2.2325×10$^{-3}$
$(d_1+d_2+d_3+d_4)/f$=1.785
$d_1/f$=0.751, $d_2/f$=0.24, $d_3/f$=0.783, $S_2$=0.071

EMBODIMENT 5

| f = 7.609, $f_1$ = 30.089, $f_2$ = 5.727 | | | |
|---|---|---|---|
| $r_1$ = 103.580 (aspherical surface) | | | |
| | $d_1$ = 2.517 | $n_1$ = 1.48978 | $v_1$ = 57.66 |
| $r_2$ = −17.044 | | | |
| | $d_2$ = 9.506 | | |
| $r_3$ = −3.295 (aspherical surface) | | | |
| | $d_3$ = 3.802 | $n_2$ = 1.48978 | $v_2$ = 57.66 |
| $r_4$ = −2.090 | | | |
| | $d_4$ = 1.629 | | |
| $r_5$ = ∞ | | | | aspherical surface coefficients
(1st surface) $A_4$=2.0601×10$^{-4}$, $A_6$=2.6396×10$^{-6}$ (3rd surface) $A_4=-2.2610\times10^{-2}$, $A_6=-7.1068\times10^{-3}$
$(d_1+d_2+d_3+d_4)/f=2.294$
$d_1/f=0.331$, $d_2/f=1.249$, $d_3/f=0.5$, $S_2=0.224$

EMBODIMENT 6

| f = 9.862, | $f_1$ = 13.409, | $f_2$ = 4.421 | |
|---|---|---|---|
| $r_1$ = 6.614 (aspherical surface) | | | |
| | $d_1$ = 5.675 | $n_1$ = 1.48978 | $v_1$ = 57.66 |
| $r_2$ = −670.023 | | | |
| | $d_2$ = 4.226 | | |
| $r_3$ = −2.322 (aspherical surface) | | | |
| | $d_3$ = 5.029 | $n_2$ = 1.48978 | $v_2$ = 57.66 |
| $r_4$ = −1.918 | | | |
| | $d_4$ = 0.063 | | |
| $r_5$ = ∞ | | | | aspherical surface coefficients (1st surface) $A_4=1.4770\times10^{-4}$, $A_6=7.4564\times10^{-7}$
(3rd surface) $A_4=-4.3742\times10^{-3}$, $A_6=2.7251\times10^{-3}$
$(d_1+d_2+d_3+d_4)/f=1.52$
$d_1/f=0.575$, $d_2/f=0.429$, $d_3/f=0.51$, $S_2=0.095$

EMBODIMENT 7

| f = 4.505, | $f_1$ = 121.875, | $f_2$ = 4.227 | |
|---|---|---|---|
| $r_1$ = 70.000 (aspherical surface) | | | |
| | $d_1$ = 4.224 | $n_1$ = 1.48978 | $v_1$ = 57.66 |
| $r_2$ = −397.289 | | | |
| | $d_2$ = 3.372 | | |
| $r_3$ = −6.988 (aspherical surface) | | | |
| | $d_3$ = 10.136 | $n_2$ = 1.48978 | $v_2$ = 57.66 |
| $r_4$ = −2.359 | | | |
| | $d_4$ = 0.100 | | |
| $r_5$ = ∞ | | | | aspherical surface coefficients (1st surface) $A_4=1.5242\times10^{-3}$, $A_6=1.1470\times10^{-5}$
(3rd surface) $A_4=-7.5712\times10^{-3}$, $A_6=3.4416\times10^{-5}$
$(d_1+d_2+d_3+d_4)/f=3.958$
$d_1/f=0.938$, $d_2/f=0.748$, $d_3/f=2.25$, $S_2=0.495$

EMBODIMENT 8

| f = 10.275, | $f_1$ = 13.356, | $f_2$ = 4.335 | |
|---|---|---|---|
| $r_1$ = 7.716 (aspherical surface) | | | |
| | $d_1$ = 5.601 | $n_1$ = 1.48978 | $v_1$ = 57.66 |
| $r_2$ = −32.718 | | | |
| | $d_2$ = 4.136 | | |
| $r_3$ = −2.458 (aspherical surface) | | | |
| | $d_3$ = 7.659 | $n_2$ = 1.48978 | $v_2$ = 57.66 |
| $r_4$ = −2.306 | | | |
| | $d_4$ = 0.100 | | |
| $r_5$ = ∞ | | | | aspherical surface coefficients (1st surface) $A_4=3.6485\times10^{-4}$, $A_6=3.4277\times10^{-7}$
(3rd surface) $A_4=-6.5810\times10^{-4}$, $A_6=1.9013\times10^{-3}$
$(d_1+d_2+d_3+d_4)/f=1.703$
$d_1/f=0.545$, $d_2/f=0.403$, $d_3/f=0.745$, $S_2=0.032$

EMBODIMENT 9

| f = 7.489, | $f_1$ = 29.466, | $f_2$ = 5.255 | |
|---|---|---|---|
| $r_1$ = 16.685 (aspherical surface) | | | |
| | $d_1$ = 3.256 | $n_1$ = 1.48978 | $v_1$ = 57.66 |
| $r_2$ = −100.000 | | | |
| | $d_2$ = 6.378 | | |
| $r_3$ = −7.124 (aspherical surface) | | | |
| | $d_3$ = 8.924 | $n_2$ = 1.48978 | $v_2$ = 57.66 |
| $r_4$ = −2.669 | | | |
| | $d_4$ = 0.100 | | |
| $r_5$ = ∞ | | | | aspherical surface coefficients (1st surface) $A_4=4.5803\times10^{-4}$, $A_6=1.2982\times10^{-6}$
(3rd surface) $A_4=-5.5705\times10^{-3}$, $A_6=1.1329\times10^{-4}$
$(d_1+d_2+d_3+d_4)/f=2.491$
$d_1/f=0.435$, $d_2/f=0.852$, $d_3/f=1.192$, $S_2=0.455$ wherein the reference symbols $r_1$ through $r_4$ represent radii of curvature on surfaces of respective lens components, the reference symbol $r_5$ designates an aperture stop, the reference symbols $d_1$ through $d_4$ denote thicknesses and airspaces reserved therebetween, the reference symbols $n_1$ and $n_2$ represent refractive indices of the respective lens components, the reference symbols $v_1$ and $v_2$ designate Abbe's numbers of the respective lens components, the reference symbols $f_1$ and $f_2$ denote focal lengths of the respective lens components at a wavelength of 660 nm, and the reference symbol f represents a total focal length of the reading lens system at the wavelength of 660 nm.

Further, the aspherical surfaces used in the embodiments have shapes expressed by the formula shown below:

$$x=Ch^2/\{1+(1-C^2h^2)^{1/2}\}+A_4h^4+A_6h^6$$

wherein the reference symbol x represents a distance measured in a direction of an optical axis, the reference symbol h designates a distance measured in a direction perpendicular to the optical axis, the reference symbol c denotes an axial curvature, and the reference symbols $A_4$ and $A_6$ represent aspherical surface coefficients.

Figure 10:
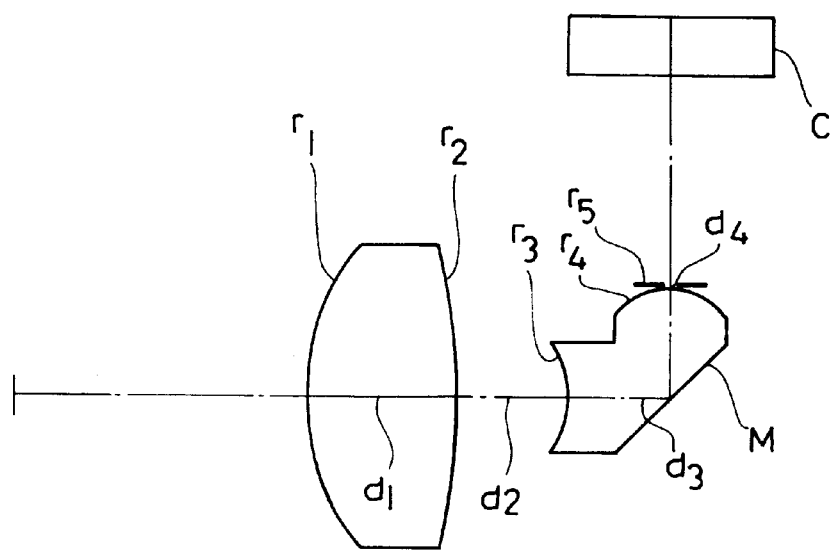
FIGS. 10 through 12 exemplify compositions in each of which an optical path is folded by disposing a reflecting surface in the reading lens system according to the present invention.
Figure 11:
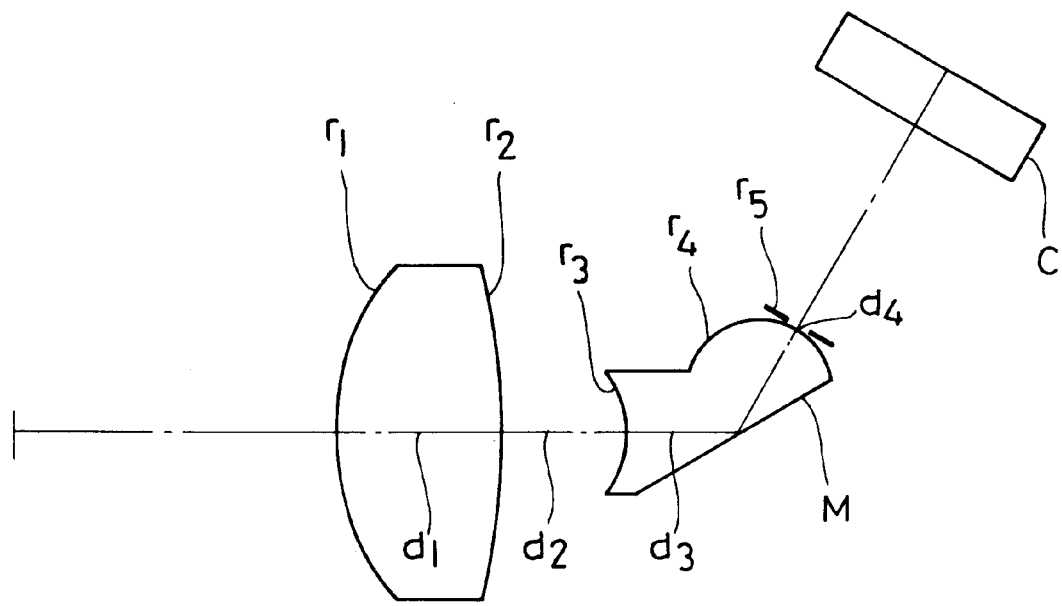
Figure 12:
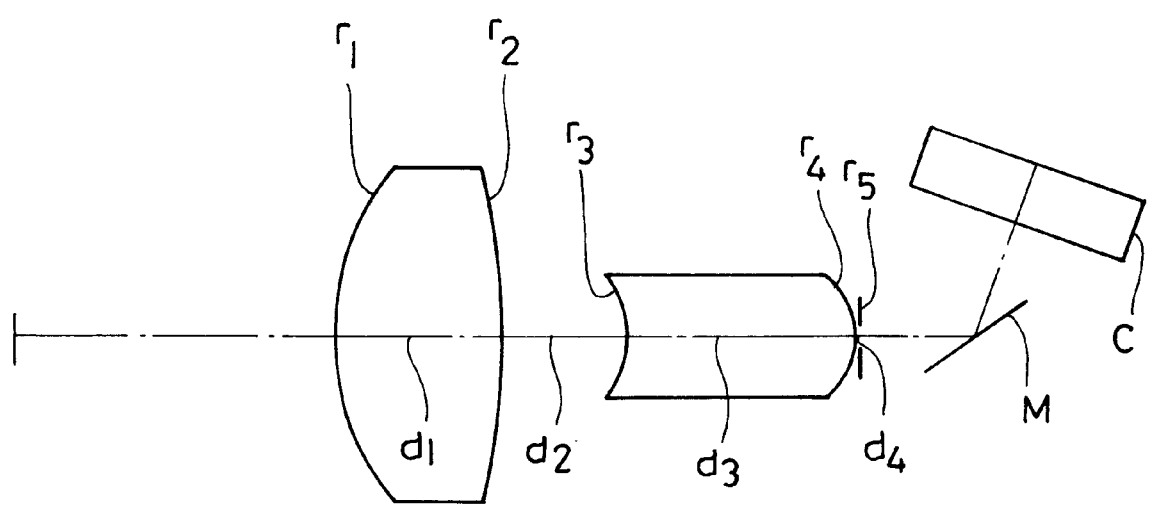

In each of FIGS. 10, 11 and 12, a reflecting surface is used in an optical path of the lens system preferred as the first embodiment of the present invention for bending the optical path.

In each of FIGS. 10 and 11 out of these drawings, a reflecting surface M is disposed in the second lens component $L_2$ for bending the optical path. In FIG. 10, the reflecting surface M is used for bending the optical path at an angle of 90° at a location 3.5 mm apart from the third surface on the optical axis of the optical system preferred as the first embodiment. In FIG. 11, the reflecting surface M is used for bending the optical path at an angle of 120° at the location 3.5 mm apart from the third surface on the optical axis of the optical system preferred as the first embodiment.

In FIG. 12, a reflecting mirror M for bending the optical axis at an angle of 110° is disposed on the optical axis of the optical system preferred as the first embodiment at a location 3.6 mm aDart as measured from the aperture stop.

In the drawings illustrating the embodiments, the reference symbol C represents a cover glass plate for a light receiving element CCD which is disposed on the image side and 2 mm thick, and has a refractive index of 1.54.

Now, description will be made of an embodiment of a two-dimensional code reader as a whole which uses the reading lens system according to the present invention.

Figure 13:
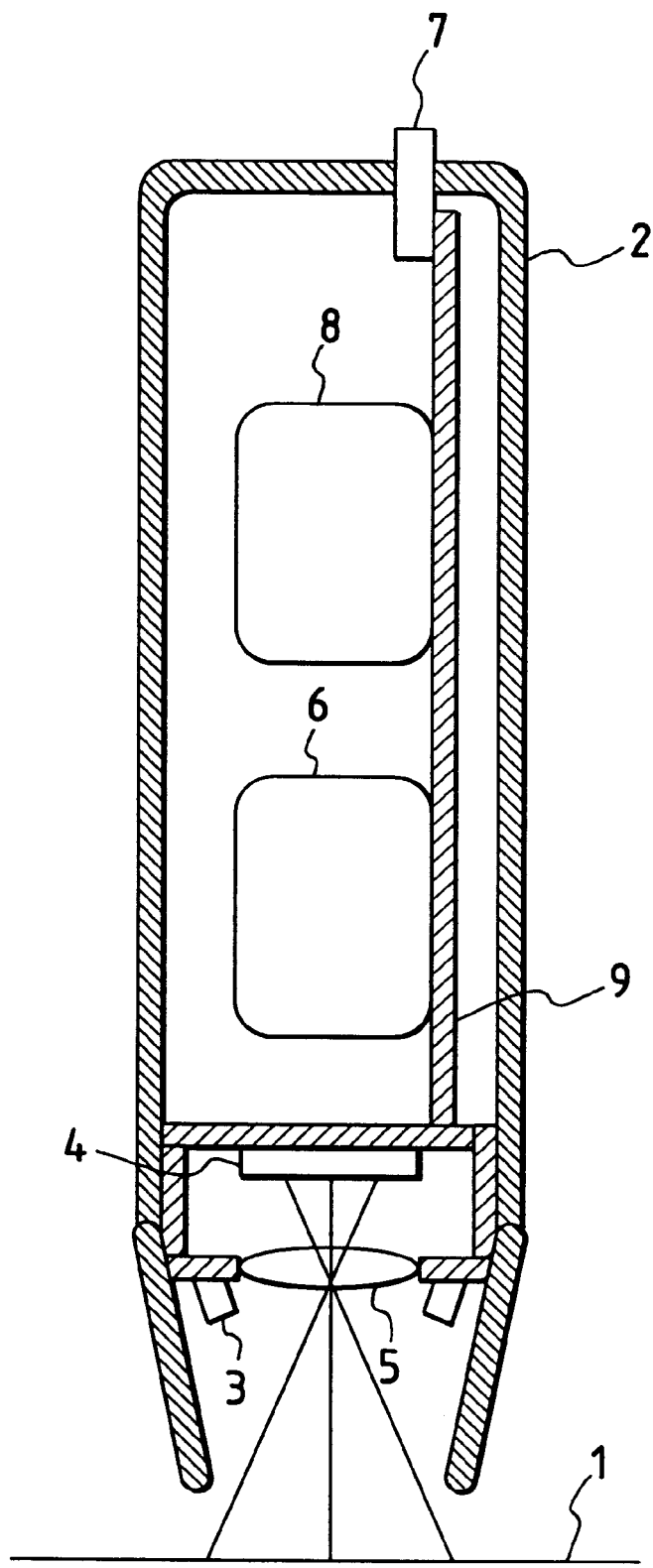
FIG. 13 shows a sectional view illustrating an overall configuration of a two-dimensional code reader using the reading lens system according to the present invention.
Figure 14:
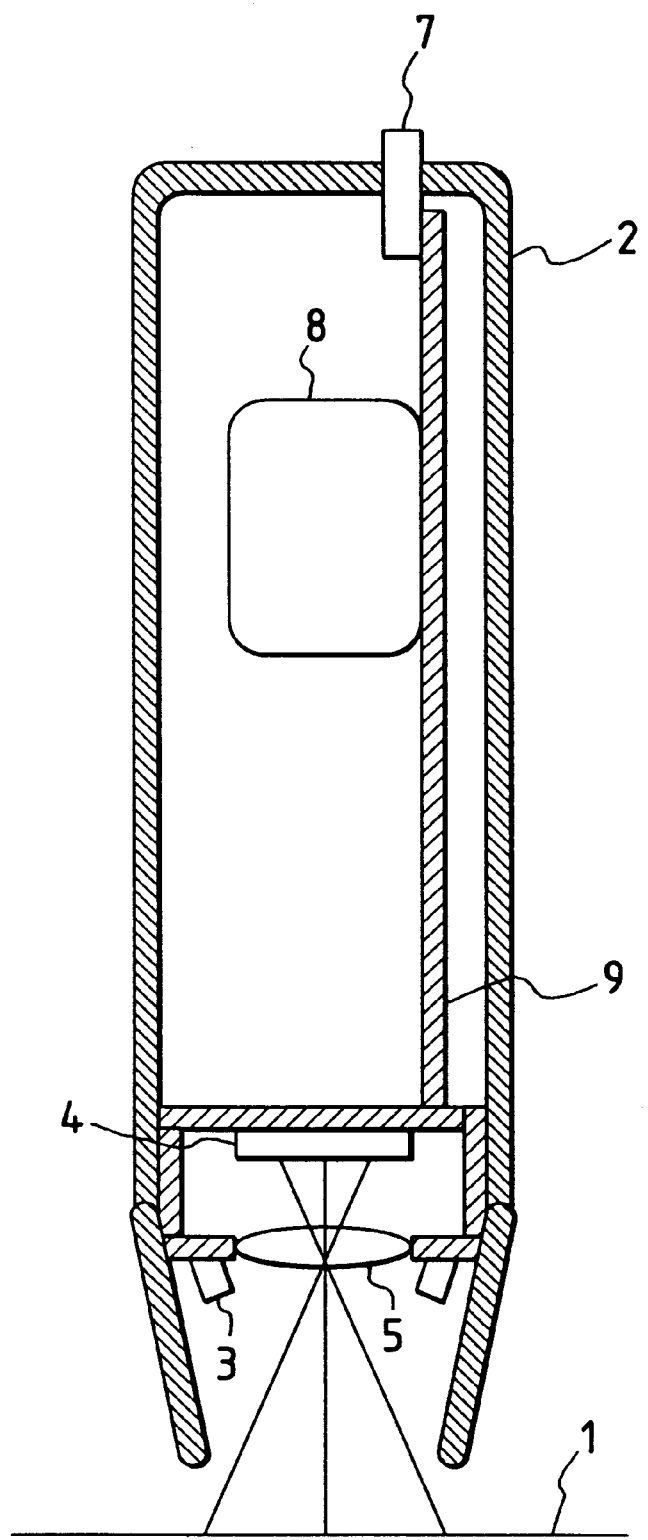
FIG. 14 shows a sectional view illustrating an overall configuration of another code reader using the reading lens system according to the present invention.

The two-dimensional code reader consists of an illuminating section 3, an image pickup section 4, a reading lens system section 5, a signal processing section 6, a signal output section 7, a power source section 8, a support member and a circuit board 9 which are accommodated in a casing 2 as shown in FIG. 13.

While illuminating a two-dimensional code recording medium 1 composed of paper, a resin film or a metal sheet on which two-dimensional bar codes or dot codes are recorded in an optically readable mode with the illuminating section 3 such as a light emitting diode, images of the two-dimensional codes are formed on the image pickup section 4 such as a CCD with the reading lens section 5. The signal processing section 6 processes image signals obtained on the basis of the images of the two-dimensional codes picked up by the image pickup section 4 and converts the signal into information signals such as voice signals, character signals or video signals for externally outputting through the signal output section 7. The externally output signals are reproduced with an external reproducer such as a loud speaker or an ear phone in the case of voice signals or with a TV monitor in the case of character signals or video signals. The illuminating section 3, the image pickup section 4, signal processing section 6 and signal output section 7 are driven with the power source section 8 such as a dry battery. The sections disposed in the casing 2 are supported with the support member and the circuit board 9, and wired to one another.

The two-dimensional code reader according to the present invention is not limited to this embodiment, and modifiable into a code reader which does not use the power source section 8 disposed in the casing 2 and receives power from an external power source.

Further, the two-dimensional code reader according to the present invention may not use the signal processing section 6 and be combined with a personal computer so that the signal output section 7 outputs the image signals obtained directly from images having the two-dimensional codes picked up with the image pickup section 4 and the personal computer performs signal processings for reproducing the image signals into information signals such as voice signals, character signals or video signals. In this case also, the power source section 8 may not be disposed in the casing 2 and power may be supplied from an external power source.

The reading lens system according to the present invention has a short total length, is composed of a small number of lens components, allows little variation of a size of an image caused by defocusing of the image due to a variation of an object location, and produces astigmatism and distortion in small amounts.

We claim:

1. A reading lens system comprising, in order from an object side:

a first positive biconvex lens component;

a second positive meniscus lens component that is convex toward an image side; and an aperture stop disposed on the image side of said second lens component;

wherein said reading lens system satisfies the following condition (2)

$$0.89 \leq (d_1+d_2+d_3+d_4)/f \leq 5.70 \quad (2)$$

wherein the reference symbol f represents a focal length of said reading lens system as a whole, the reference symbol d1 designates a thickness of said first lens component, the reference symbol d2 denotes an airspace reserved between said first lens component and said second lens component, the reference symbol d3 represents a thickness of the second lens component and the reference symbol d4 designates an airspace reserved between said second lens component and said aperture stop.

2. A reading lens system comprising, in order from an object side:

a first positive biconvex lens component;

a second positive meniscus lens component that is convex toward an image side; and an aperture stop disposed on the image side of said second lens component;

wherein said reading lens system satisfies the following condition (3):

$$1.52 \leq (d_1+d_2+d_3+d_4)/f \leq 4.22 \quad (3)$$

wherein the reference symbol f represents a focal length of said reading lens system as a whole, the reference symbol $d_1$ designates a thickness of said first lens component, the reference symbol $d_2$ denotes an airspace reserved between said first lens component and said second lens component, the reference symbol $d_3$ represents a thickness of the second lens component and the reference symbol $d_4$ designates an airspace reserved between said second lens component and said aperture stop.

3. A reading lens system according to claim 1 satisfying at least one of the following conditions (8), (9), (10) and (11):

$$0.20 \leq d_1/f \leq 2.32 \quad (8)$$
   $$0.17 \leq d_2/f \leq 1.78 \quad (9)$$
   $$0.27 \leq d_3/f \leq 4.63 \quad (10)$$
   $$0.03 \leq S_2 \leq 0.70 \quad (11)$$

wherein the reference symbol $S_2$ is a value which is given by the equation shown below:

$$S_2=(r_3-r_4)/(r_3+r_4)$$

wherein the reference symbol $r_3$ represents a radius of curvature on an object side surface of said second lens component and the reference symbol $r_4$ designates a radius of curvature on an image side surface of said second lens component.

4. A reading lens system according to claim 2 satisfying at least one of the following conditions (12), (13), (14) and (15):

$$0.32 \leq d_1/f \leq 1.83 \quad (12)$$
   $$0.23 \leq d_2/f \leq 1.26 \quad (13)$$
   $$0.49 \leq d_3/f \leq 2.26 \quad (14)$$
   $$0.03 \leq S_2 \leq 0.50 \quad (15)$$

wherein the reference symbol $S_2$ is a value which is given by the equation shown below:

$$S_2=(r_3-r_4)/(r_3+r_4)$$

wherein the reference symbol $r_3$ represents a radius of curvature on an object side surface of said second lens component and the reference symbol $r_4$ designates a radius of curvature on an image side surface of said second lens component.

5. A reading lens system comprising, in order from an object side:
a first positive biconvex lens component;
a second positive meniscus lens component that is convex toward an image side; and
an aperture stop disposed on the image side of said second lens component;
wherein said reading lens system satisfies at least one of the following conditions (16), (17), (18) and (19):

$$0.28 \leq d_1/f \leq 0.88 \qquad (16)$$

$$0.39 \leq d_2/f \leq 0.66 \qquad (17)$$

$$0.79 \leq d_3/f \qquad (18)$$

$$0.09 \leq S_2 \leq 0.15 \qquad (19)$$

wherein the reference symbol f represents a focal length of said reading lens system as a whole, the reference symbol $d_1$ designates a thickness of said first lens component, the reference symbol $d_2$ designates an airspace reserved between said first lens component and said second lens component, the reference symbol $d_3$ denotes a thickness of said second lens component, and the reference symbol $S_2$ represents a value given by the equation $$S_2=(r_3-r_4)/(r_3+r_4)$$

wherein the reference symbol $r_3$ represents a radius of curvature on an object side surface of said second lens component and the reference symbol $r_4$ designates a radius of curvature on an image side surface of said second lens component.

6. A reading lens system comprising, in order from an object side:
a first positive biconvex lens component;
a second positive meniscus lens component that is convex toward an image side; and
an aperture stop disposed on the image side of said second lens component;
wherein said reading lens system satisfies at least one of the following conditions (16), (17), (19) and (20):

$$0.28 \leq d_1/f \leq 0.88 \qquad (16)$$

$$0.39 \leq d_2/f \leq 0.66 \qquad (17)$$

$$0.09 \leq S_2 \leq 0.15 \qquad (19)$$

$$0.79 \leq d_3/f 2.50 \qquad (20)$$

wherein the reference symbol f represents a focal length of said reading lens system as a whole, the reference symbol $d_1$ designates a thickness of said first lens component, the reference symbol $d_2$ designates an airspace reserved between said first lens component and said second lens component, the reference symbol $d_3$ denotes a thickness of said second lens component, and the reference symbol $S_2$ represents a value given by the equation $$S_2=(r_3-r_4)/(r_3+r_4)$$

wherein the reference symbol $r_3$ represents a radius of curvature on an object side surface of said second lens component and the reference symbol $r_4$ designates a radius of curvature on an image side surface of said second lens component.

7. A reading lens system comprising, in order from an object side:
a first positive biconvex lens component;
a second positive meniscus lens component that is convex toward an image side; and
an aperture stop disposed on the image side of said second lens component;
wherein said reading lens system satisfies at least one of the following conditions (21), (22), (23) and (24):

$$0.46 \leq d_1/f \leq 0.75 \qquad (21)$$

$$0.44 \leq d_2/f \leq 0.57 \qquad (22)$$

$$0.85 \leq d_3/f \leq 2.50 \qquad (23)$$

$$0.11 \leq S_2 \leq 0.14 \qquad (24)$$

wherein the reference symbol f represents a focal length of said reading lens system as a whole, the reference symbol $d_1$ designates thickness of said first lens component, the reference symbol $d_2$ designates an airspace reserved between said first lens component and said second lens component, the reference symbol $d_3$ denotes a thickness of said second lens component, and the reference symbol $S_2$ represents a value given by the equation $$S_2=(r_3-r_4)/(r_3+r_4)$$

wherein the reference symbol $r_3$ represents a radius of curvature on an object side surface of said second lens component and the reference symbol $r_4$ designates a radius of curvature on an image side surface of said second lens component.

8. A reading lens system comprising, in order from an object side:
a first positive biconvex lens component;
a second positive meniscus lens component that is convex toward an image side; and
an aperture stop disposed on the image side of said second lens component;
wherein said reading lens system satisfies the following conditions (25), (26), (27) and (28):

$$0.03 \leq d_1/f \leq 0.88 \qquad (25)$$

$$0.12 \leq d_2/f \leq 3.80 \qquad (26)$$

$$0.33 \leq d_3/f \qquad (27)$$

$$0.01 \leq S_2 \leq 3.00 \qquad (28)$$

wherein the reference symbol f represents a focal length of said reading lens system as a whole, the reference symbol $d_1$ designates a thickness of said first lens component, the reference symbol $d_2$ designates an airspace reserved between said first lens component and said second lens component, the reference symbol $d_3$ denotes a thickness of said second lens component, and the reference symbol $S_2$ represents a value given by the equation $$S_2=(r_3-r_4)/(r_3+r_4)$$

wherein the reference symbol $r_3$ represents a radius of curvature on an object side surface of said second lens component and the reference symbol $r_4$ designates a radius of curvature on an image side surface of said second lens component.

9. A reading lens system composed, in order from the object side:

a first positive biconvex lens component;

a second positive meniscus lens component that is convex toward the image side; and an aperture stop disposed on the image side of said second lens component;

wherein said reading lens system satisfies the following conditions (29), (30), (31) and (32):

$$0.11 \leq d_1/f \leq 0.88 \quad (29)$$

$$0.17 \leq d_2/f \leq 2.53 \quad (30)$$

$$0.41 \leq d_3/f \quad (31)$$

$$0.02 \leq S_2 \leq 1.75 \quad (32)$$

wherein the reference symbol f represents a focal length of said reading lens system as a whole, the reference symbol $d_1$ designates a thickness of said first lens component, the reference symbol $d_2$ designates an airspace reserved between said first lens component and said second lens component, the reference symbol $d_3$ denotes a thickness of said second lens component, and the reference symbol $S_2$ represents a value given by the equation $$S_2=(r_3-r_4)/(r_3+r_4)$$

wherein the reference symbol $r_3$ represents a radius of curvature on an object side surface of said second lens component and the reference symbol $r_4$ designates a radius of curvature on an image side surface of said second lens component.

10. A reading lens system comprising, in order from an object side:

a first positive biconvex lens component;

a second positive meniscus lens component that is convex toward an image side; and an aperture stop disposed on the image side of said second lens component;

wherein said reading lens system satisfies the following conditions (33), (34), (35) and (36):

$$0.20 \leq d_1/f \leq 0.88 \quad (33)$$

$$0.23 \leq d_2/f \leq 1.26 \quad (34)$$

$$0.49 \leq d_3/f \quad (35)$$

$$0.03 \leq S_2 \leq 0.50 \quad (36)$$

wherein the reference symbol f represents a focal length of said reading lens system as a whole, the reference symbol $d_1$ designates a thickness of said first lens component, the reference symbol $d_2$ designates an airspace reserved between said first lens component and said second lens component, the reference symbol $d_3$ denotes a thickness of said second lens component, and the reference symbol $S_2$ represents a value given by the equation $$S_2=(r_3-r_4)/(r_3+r_4)$$

wherein the reference symbol $r_3$ represents a radius of curvature on an object side surface of said second lens component and the reference symbol $r_4$ designates a radius of curvature on an image side surface of said second lens component.

11. A reading lens system according to any one of claims 1, 2 or 5 through 10 wherein at least one lens surface is configured as an aspherical surface.

12. A reading lens system according to claim 11 wherein an object side surface of said first lens component and an object side surface of said second lens component are configured as aspherical surfaces.

13. A reading lens system according to any one of claims 1, 2 or 5 through 10 wherein said first lens component and said second lens component are made of a plastic material.

14. A reading lens system according to any one of claims 1, 2 or 5 through 10 wherein a reflecting surface is disposed in an optical path between an object surface and an image surface of said reading lens system.

15. A two-dimensional code reader comprising:

an illuminating section for illuminating a medium on which two-dimensional codes are recorded;

an image pickup section for picking up images of said two-dimensional codes;

a reading lens system section which functions to image said two-dimensional codes onto said image pickup section, and is composed, in order from an object side, of a first positive biconvex lens component, a second positive meniscus lens component that is convex toward an image side and an aperture stop disposed on the image side of said second lens component;

a signal processing section which processes image signals on the basis of an image picked up by said image pickup section and converts them into predetermined information signals; and a signal output section for externally outputting the information signals processed by said signal processing section.

16. A two-dimensional code reader comprising:

an illuminating section for illuminating a medium on which two-dimensional codes are recorded;

an image pickup section for picking up images of said two-dimensional codes;

a reading lens system section which functions to image said two-dimensional codes onto said image pickup section, and is composed, in order from an object side, of a first positive biconvex lens component, a second positive meniscus lens component that is convex toward an image side and an aperture stop disposed on the image side of said second lens component; and a signal output section for externally outputting image signals on the basis of the images picked up by said image pickup section.

* * * * *